No. 842,203. PATENTED JAN. 29, 1907.
J. B. HOWERTON.
VEHICLE BRAKE.
APPLICATION FILED JULY 28, 1906.
2 SHEETS—SHEET 1.
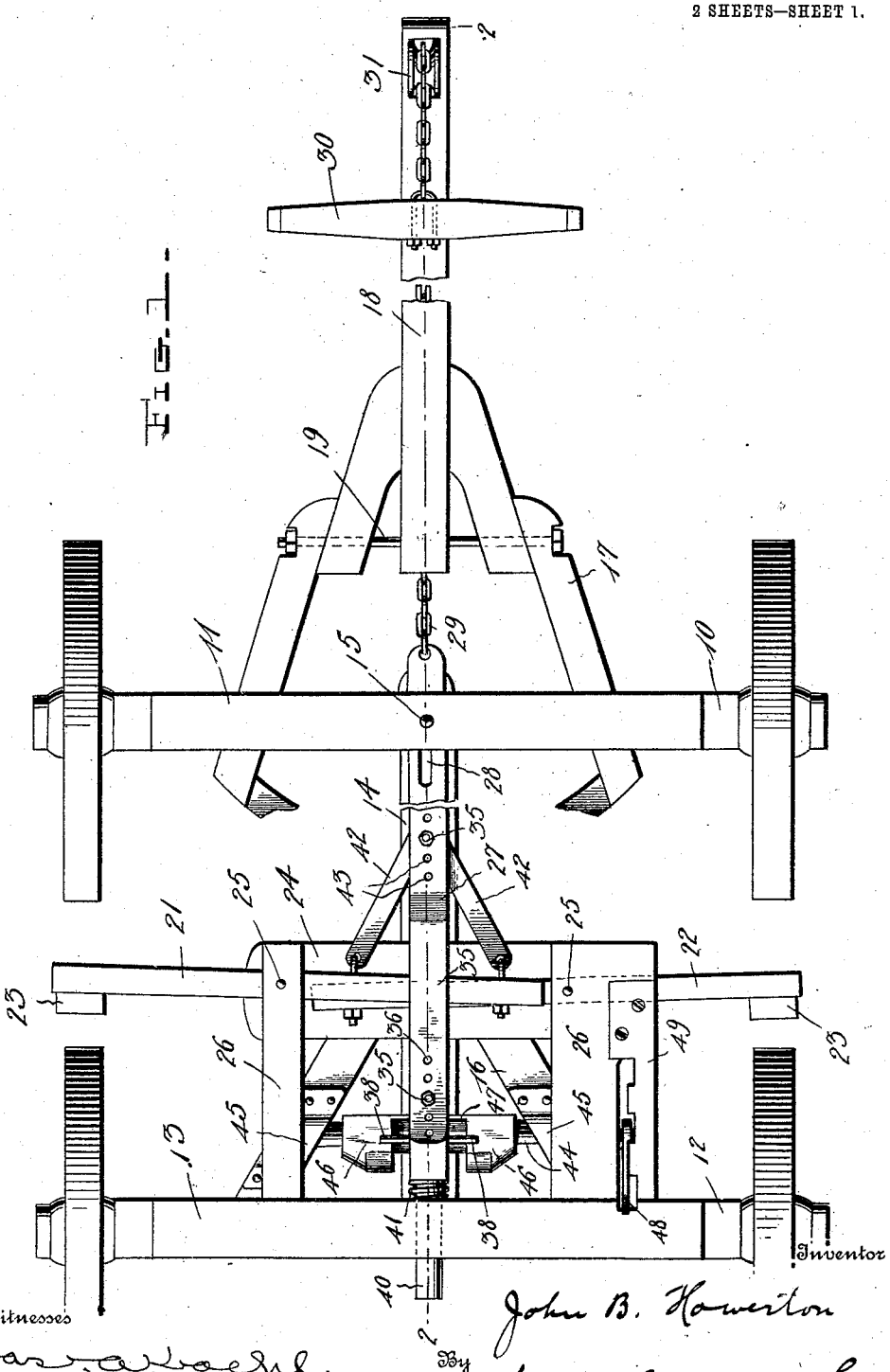
Witnesses
Inventor
John B. Howerton
By
Attorneys No. 842,203. PATENTED JAN. 29, 1907.
J. B. HOWERTON.
VEHICLE BRAKE.
APPLICATION FILED JULY 28, 1906.
2 SHEETS—SHEET 2.
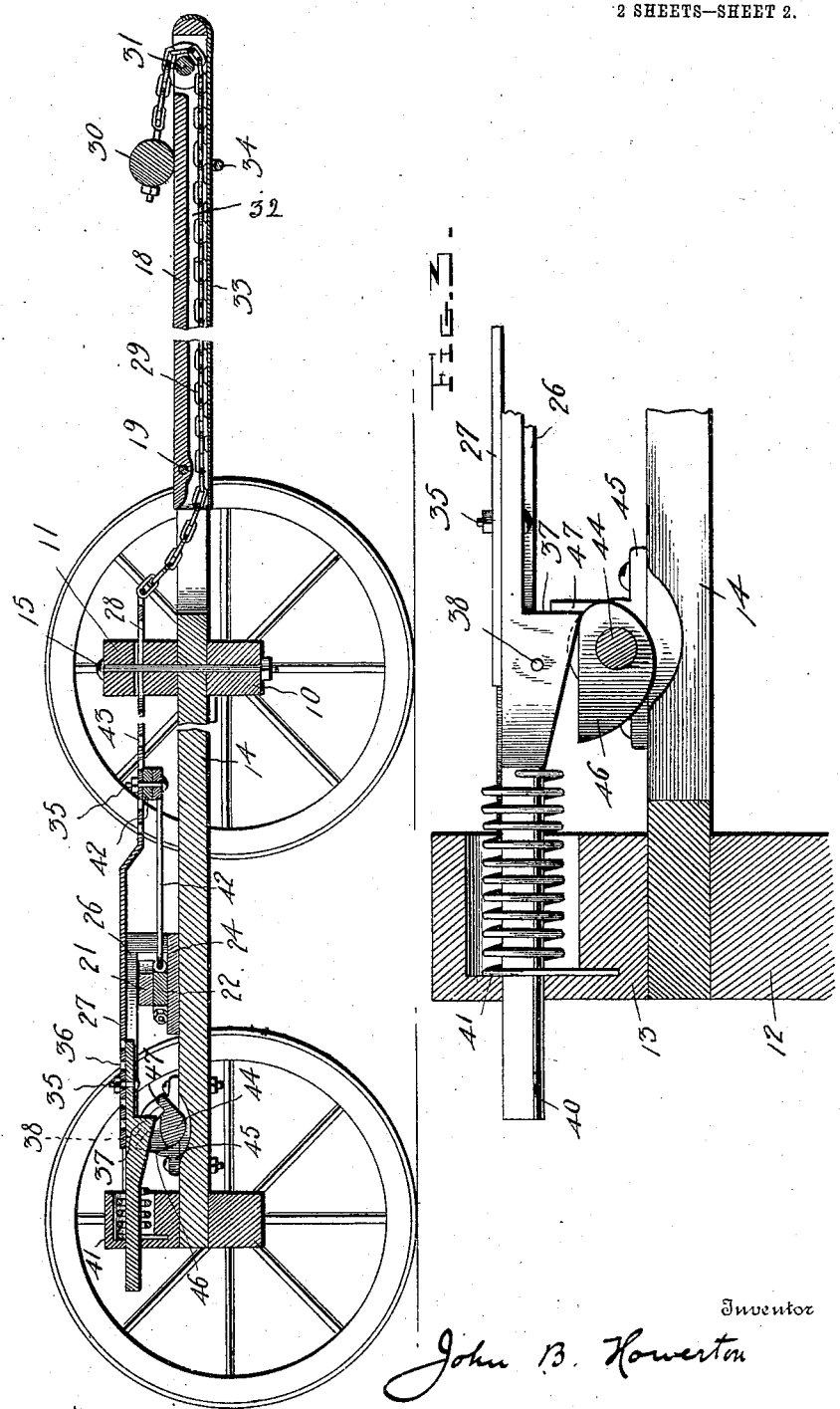

UNITED STATES PATENT OFFICE.

JOHN B. HOWERTON, OF BURKE, KENTUCKY.

VEHICLE-BRAKE.

No. 842,203.   Specification of Letters Patent.   Patented Jan. 29, 1907.

Application filed July 28, 1906. Serial No. 328,236.

*To all whom it may concern:*

Be it known that I, JOHN B. HOWERTON, a citizen of the United States, residing at Burke, in the county of Elliott and State of Kentucky, have invented new and useful Improvements in Vehicle-Brakes, of which the following is a specification.

This invention is a vehicle-brake, and more particularly an automatic brake which is operated by the team in holding back upon going down grade.

The object of the invention is to provide a brake of this kind embodying simplicity of construction, so that it can be readily applied to any ordinary wagon.

A further object is to provide improved means for holding the brake inoperative when necessary to prevent its application, as when backing the vehicle.

A further object is to provide means whereby the brake may be operated by hand.

With these and other objects in view, as will appear more fully hereinafter, the invention consists in a novel arrangement and combination of parts to be described and claimed.

In the accompanying drawings, Figure 1 is a plan view of a vehicle running-gear, showing the invention applied thereto. Fig. 2 is a longitudinal section on the line 2 2 of Fig. 1. Fig. 3 is a sectional detail showing the parts in another position.

Referring specifically to the drawings, 10 denotes the front axle, with the sand-board 11, and 12 the rear axle, with the sand-board 13. The reach 14 is connected to the front axle by the king-bolt 15. The rear hounds are indicated at 16 and the front hounds at 17. The tongue 18 is attached to the front hounds by a horizontal pivot 19 in the usual manner. These parts constitute an ordinary vehicle running-gear, and nothing is claimed with respect thereto.

The brake-beams 21 and 22, provided with brake-shoes 23, are supported on a cross-bar 24, fastened to the rear hounds 16. The brake-beams are pivoted at 25 between the cross-bar 24 and bars 26, fastened to and extending forwardly from the rear sand-board 13. The front ends of the bars 26 extend downwardly to the cross-bar 24.

At 27 is indicated a slide-bar, the front end of which extends through an opening made in the front sand-board 11, and is also slotted at 28, through which slot the king-bolt 15 extends. The slide-bar is connected by a chain 29 to the neck-yoke 30. At the front end of the tongue 18 is a vertical opening, in which a pulley 31 is journaled over which the chain passes to the neck-yoke. The under side of the tongue has a groove 32, through which the chain extends to the pulley 31. The groove is closed by a cover-plate 33. On the bottom of the neck-yoke is a staple 34, through which the tongue extends, said staple serving to retain the neck-yoke on the tongue.

The slide-bar is in two sections which are adjustably connected by bolts 35, a number of bolt-holes 36 being provided. This permits adjustment of the slide-bar when the wagon is lengthened or shortened. The rear section of the slide-bar has on its under side a shoulder 37, and from the sides of the bar project pins 38. The bar is also rounded, as at 40, and extends through an opening in the rear sand-board 13. A spring 41, tending to pull the slide-bar rearwardly, is coiled around the part 40 of the bar, one end of the spring being fastened to the bar and the other end to the sand-board.

The brake-beams 21 and 22 cross and are connected at their inner ends by links 42 to the front section of the slide-bar 27. A number of bolt-holes 43 for the purpose of adjustment are provided.

At 44 is indicated a rock-shaft which extends transversely across the rear hounds 16 and is journaled in suitable bearings 45 on said hounds behind the cross-bar 24. The rock-shaft extends under the rear section of the slide-bar and has enlargements or projections 46, which extend into the path of and are adapted to engage the pins 38. The rock-shaft also carries a projecting catch 47, engageable with the shoulder 37 for a purpose to be hereinafter described. To one end of the rock-shaft is made fast an operating-lever 48, which may be connected by a rod or in any other suitable manner to a hand-lever at the front of the wagon in reach of the driver. A notched plate 49 is provided for locking the lever 48.

The operation of the brake is as follows: Upon going downgrade the team by holding back pulls on the chain 29 and draws the slide-bar 27 forwardly, whereby the brake-beams are swung on their pivots and the brakes applied. If it is desired to hold the brakes set, the lever 48 will be swung forwardly and locked in the front notch of the plate 49. This brings the parts 46 behind the pins 38 and prevents the return of the slide-bar and the release of the brakes. Upon withdrawing the parts 46 the slide-bar is pulled rearwardly by the spring 41 and the brakes released.

To prevent the brakes from being applied when the team is backing the wagon, the lever 48 will be swung rearwardly, so that the catch 47 engages the shoulder 37, which prevents the slide-bar from being pulled forwardly, and consequently prevents the brakes from being set when the team backs.

If the brakes are to be applied by hand, the lever 48 will be swung forwardly and locked in the front notch of the plate 49. The forward swing of the lever causes the parts 46 to engage the pins 38 and push the slide-bar forwardly to set the brakes.

The brake herein described is reliable in operation and by reason of its simplicity of construction it can be readily applied to any ordinary running-gear.

The flexible connection 29 permits turning of the front axle without disturbing the position of the slide-bar 27. The location of the pivots 25 of the brake-beams is such that a powerful leverage is obtained, so that the brakes can be set with a slight application of power.

I claim—

The combination with a vehicle running-gear and neck-yoke, of a brake, a slide-bar connected to the brake and the neck-yoke, a shoulder and projecting pins on the slide-bar, a rock-shaft extending under the slide-bar and having projections which extend into the path of the pins, and a catch on the rock-shaft engageable with the aforesaid shoulder.

In testimony whereof I have signed my name to this specification in the presence of two subscribing witnesses.

JOHN B. HOWERTON.

Witnesses.
   JAS. R. DICKERSON,
   PERRY HOWERTON.